Figure 1:
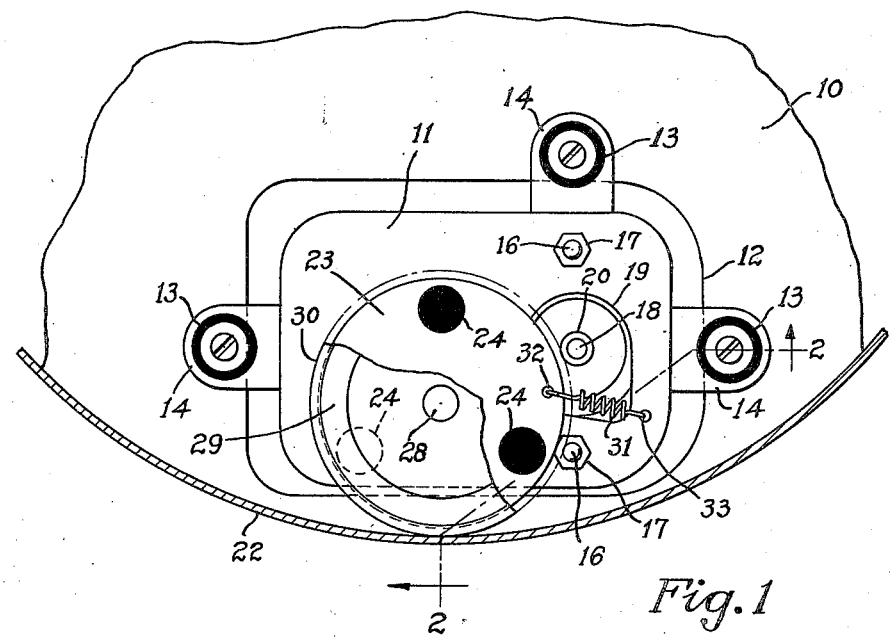

April 3, 1951 E. V. SCHNEIDER 2,547,666
IDLER WHEEL MOUNTING FOR PHONOGRAPH TURNTABLE DRIVES
Filed June 11, 1945 3 Sheets-Sheet 1

Inventor
Emmor V. Schneider
By Frease and Bishop
Attorneys

April 3, 1951 E. V. SCHNEIDER 2,547,666
IDLER WHEEL MOUNTING FOR PHONOGRAPH TURNTABLE DRIVES
Filed June 11, 1945 3 Sheets-Sheet 2
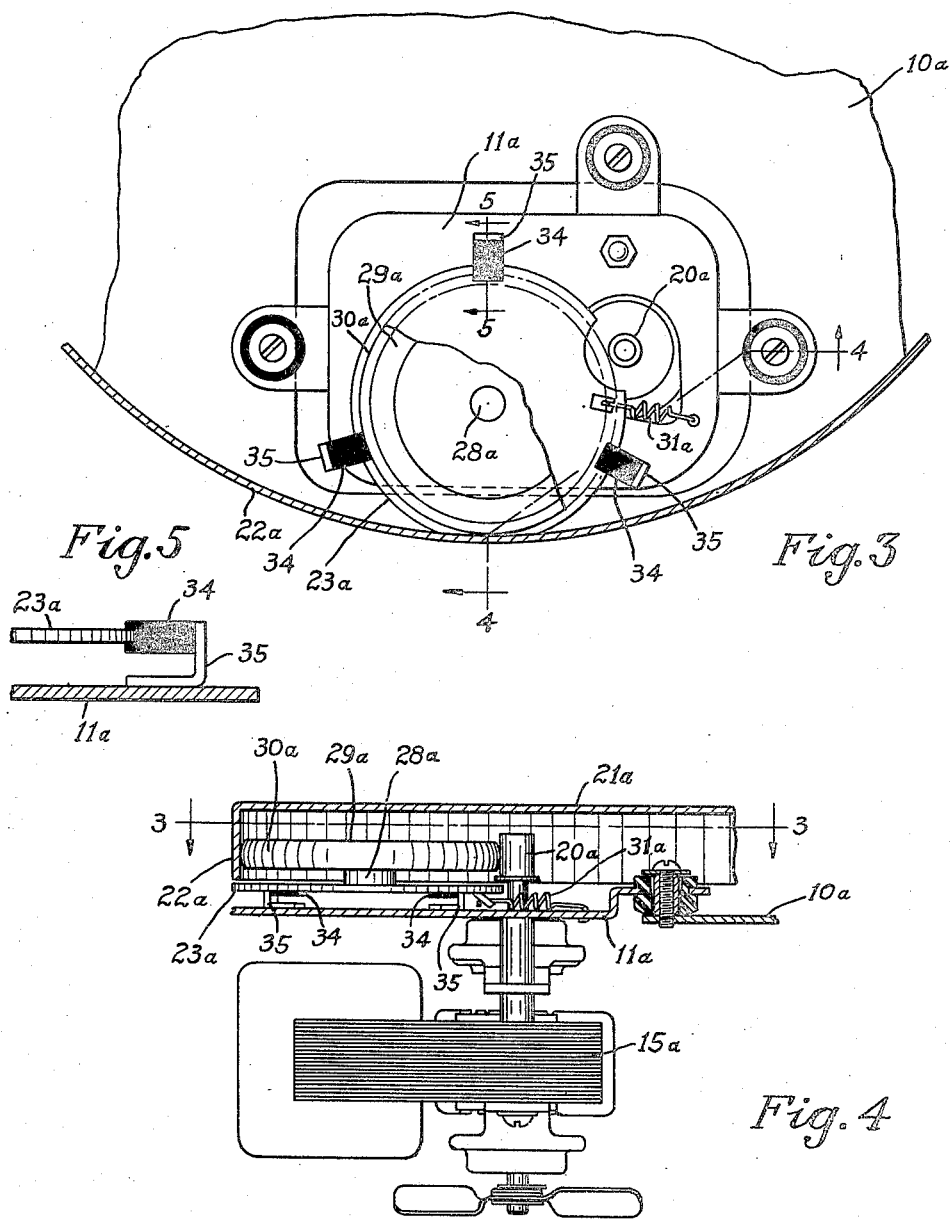
Inventor
Emmor V. Schneider
By Frease and Bishop
Attorneys April 3, 1951  E. V. SCHNEIDER  2,547,666
IDLER WHEEL MOUNTING FOR PHONOGRAPH TURNTABLE DRIVES
Filed June 11, 1945  3 Sheets-Sheet 3

Inventor
Emmor V. Schneider
By Frease and Bishop
Attorneys

Patented Apr. 3, 1951

2,547,666

UNITED STATES PATENT OFFICE 2,547,666

IDLER WHEEL MOUNTING FOR PHONOGRAPH TURNTABLE DRIVES

Emmor V. Schneider, Alliance, Ohio, assignor to The Alliance Manufacturing Company, Alliance, Ohio, a corporation of Ohio Application June 11, 1945, Serial No. 598,889

9 Claims. (Cl. 74—209)

The invention relates to rim driven phonograph turntable drive mechanism employing an idler wheel between the motor pulley and the turntable rim, and more particularly to a distortable support for the idler wheel.

Under present practice in the conventional design of rim driven phonograph turntable using an idler wheel between the motor pulley and the turntable rim, for driving the turntable, the idler wheel is carried by an idler plate which is slidably mounted usually upon the motor mounting plate, although in some instances upon the cabinet plate.

This slidable idler plate is held in equilibrium position by forces acting on the idler plate spring which holds the idler plate to the motor mounting plate; on the idler plate through the motor pulley and idler wheel rim, and on the idler plate through the turntable top and idler wheel assembly. These equilibrium forces establish the position of the slidable idler wheel plate during operation in the conventional design of turntable drive now in general use.

In order to maintain the idler wheel at right angles to the inner surface of the rim of the turntable, supporting feet are indented into the idler wheel plate at widely spaced points, and the idler wheel plate slides back and forth over the motor mounting plate, or the cabinet plate, on these supporting feet.

A large metal washer is mounted upon the lower end of the idler wheel bearing, below the motor mounting plate, or the cabinet plate as the case may be, to secure the whole assembly to the motor plate assembly.

In order for the idler wheel assembly to move freely, clearance must be provided between the motor mounting plate and this large washer, and the principal objection to this conventional assembly is that this clearance is necessary in order that the idler wheel assembly may be freely slidable.

The parts of the assembly are necessarily made of rather thin metal and they rattle against the motor plate since the mounting can not be tight. This rattle is due both to stray magnetic fields from the motor inducing vibration in the parts and also to mechanical vibration of the motor and idler wheel system carried into the idler plate and washer.

The object of the invention is to provide a mounting for the idler wheel plate which overcomes the objections to the conventional design of rim driven phonograph turntable as above set forth.

Another object is to provide a distortable mounting for the idler wheel plate which permits the required horizontal movement of the idler wheel relative to the motor pulley and turntable rim and eliminates any sliding contact between the idler plate and the motor mounting plate or cabinet plate.

Still another object of the invention is to provide such a distortable mounting in which the idler wheel plate is mounted upon flexural members.

It is a still further object to provide such a distortable mounting in which the idler wheel plate is mounted upon compression members.

A further object is to provide a distortable mounting for the idler wheel plate comprising widely spaced rubber supports connecting the idler wheel plate in fixed vertical position spaced above the motor mounting plate or cabinet plate and providing for variable horizontal position of the idler wheel plate to compensate for eccentricity and out of round characteristics in the turntable rim and motor pulley and to take care of the wear on the rubber tire of the idler wheel.

A still further object is to provide such a distortable mounting for the idler wheel plate in the form of rubber supports pressed into apertures in the idler wheel plate and motor plate.

Still another object is to provide such a distortable mounting comprising rubber supports bonded to the metal idler plate.

A further object is to provide a flexural mounting in the form of coil springs connecting the idler wheel plate in spaced relation to the motor mounting plate.

Figure 2:
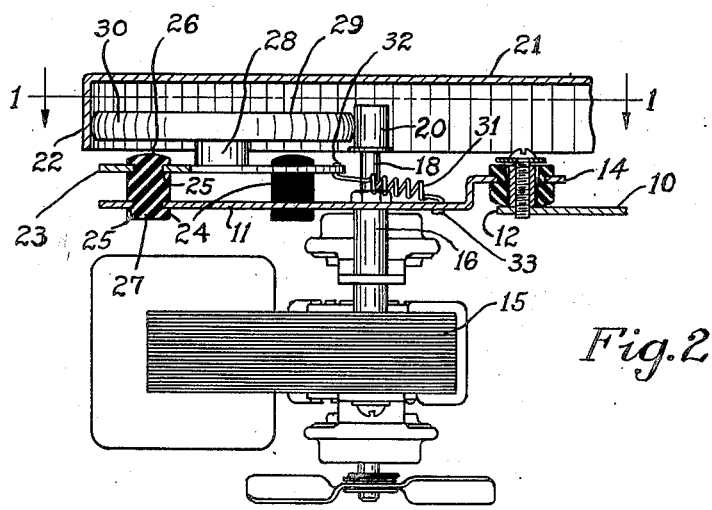
Figure 6:
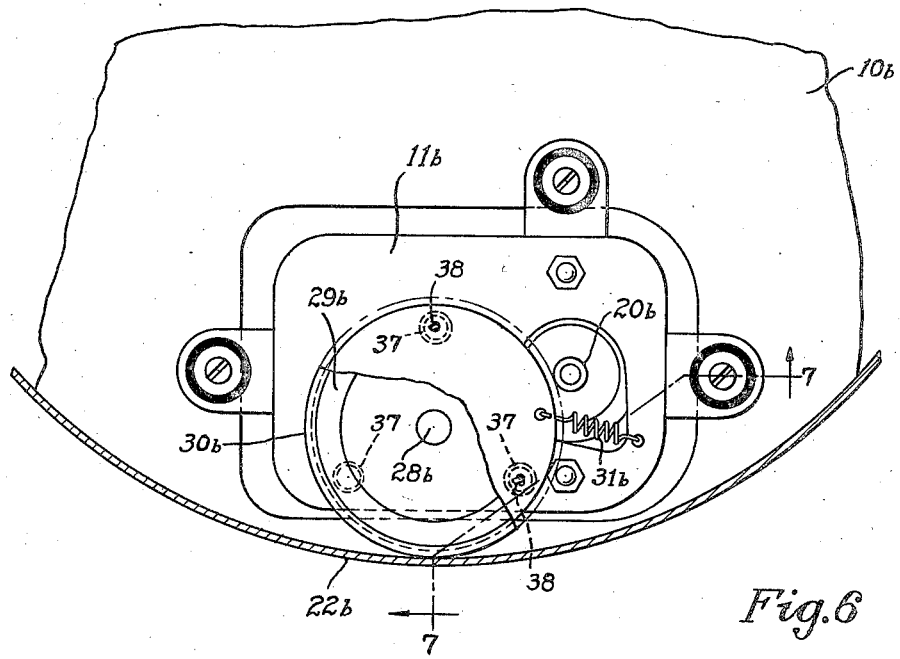
Figure 7:
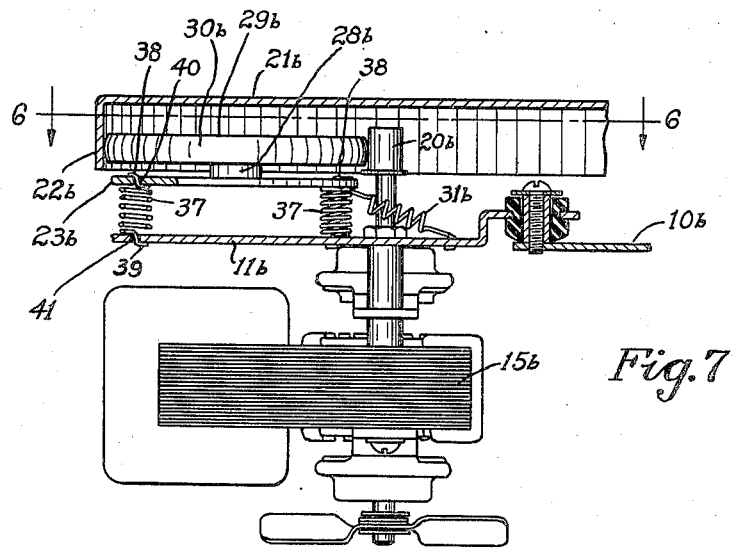

The above objects, together with others which will be apparent from the drawings and following description or which may be later referred to, may be attained by constructing the phonograph motor drive assembly in the manner illustrated in the accompanying drawings, in which:

Figure 1 is a fragmentary plan sectional view of a phonograph motor turntable drive provided with the improved distortable mounting for the idler plate wheel in the form of flexural rubber supports, taken as on the line 1—1, Fig. 2;

Fig. 2 a vertical sectional view of the structure shown in Fig. 1, taken substantially on the line 2—2, Fig. 1;

Fig. 3 a view similar to Fig. 1 showing a modified form of distortable mounting in which the rubber supports are compression members bonded to the metal idler wheel plate, taken on line 3—3, Fig. 4;

Fig. 4 a vertical sectional view through the form of the invention shown in Fig. 3 taken substantially on the line 4—4, Fig. 3;

Fig. 5 an enlarged detail sectional view of one of the rubber compression supports shown in Figs. 3 and 4;

Fig. 6 a plan sectional view similar to Figs. 1 and 3 showing the flexural mounting for the idler wheel plate in the form of coil springs, taken on the line 6—6, Fig. 7, and;

Fig. 7 a sectional view taken substantially on the line 7—7, Fig. 6.

Referring first to the form of the invention illustrated in Figs. 1 and 2, a portion of the usual cabinet plate of a phonograph is indicated at 10, this plate being ordinarily a metal plate which is supported upon the platform of the phonograph cabinet in usual and well known manner.

Although in some few cases the motor is mounted directly upon this cabinet plate it is generally customary to provide a separate motor mounting plate carrying the motor and resiliently mounted upon the cabinet plate so as to prevent as far as possible vibration from the motor being carried through the drive system.

The motor is disclosed in the instant application as mounted upon a separate motor supporting plate, upon which the idler wheel plate is mounted, but it should be understood that the separate motor mounting plate may be eliminated and both the motor and the idler wheel plate may be mounted directly upon the cabinet plate without in any way changing the present invention, and throughout the specification and claims where supporting plate is referred to, it should be understood that this supporting plate may be either the cabinet plate or the separate motor mounting plate.

The motor mounting plate 11 is shown located within the cut out 12 in the cabinet plate and resiliently mounted thereon in conventional manner as by rubber grommets 13 connected to the offset ears 14 of the motor mounting plate.

A conventional type of phonograph motor is indicated generally at 15, suspended from the motor supporting plate 11 as by the tie rods 16 and nuts 17 as in customary manner. The shaft 18 of the motor extends upwardly through an opening 19 in the plate 11 and has the pulley 20 fixed upon its upper end.

The turntable, indicated generally at 21, is journalled as in customary manner upon the cabinet plate 10 or other stationary portion of the device and provided with the depending peripheral rim 22. The above described portion of the phonograph drive assembly may be of any usual and conventional design.

In turntable drives of this general type, the turntable is driven by means of an idler wheel having a tire of rubber or the like which frictionally engages the motor pulley 20 and the inner surface of the turntable rim 22, the idler wheel being journalled upon a horizontally movable idler plate provided with spring means for moving the same so as to hold the tire of the idler wheel in frictional contact with the motor pulley and turntable rim at all times.

This idler wheel plate is ordinarily slidably mounted directly upon the motor supporting plate to which it is loosely secured by means of a large washer, and as above mentioned this construction results in the idler wheel plate and washer rattling against the motor mounting plate, which is a very objectionable feature in phonographs.

The present invention relates to the manner in which the idler wheel plate is mounted upon the plate which supports the motor, either the motor mounting plate as illustrated in the drawings, or the cabinet plate itself.

In order to overcome the objectionable features above referred to, this invention contemplates mounting the idler wheel plate upon supports which may be distorted in order to move the idler wheel relative to the driving means, or motor pulley, and the driven means, or turntable rim.

These supports may be of any material and construction capable of being distorted to move the idler plate as required, and they are referred to generally herein as distortable supports or supporting members; and they may be flexural members as illustrated and later described in Figs. 1, 2, 6 and 7, or compression members as shown and described in Figs. 3, 4 and 5.

In the form of the invention shown in Figs. 1 and 2 the idler wheel plate is shown in the form of a metal disc 23 flexurally connected to the motor supporting plate 11, in spaced relation above said plate, by means of the widely spaced rubber studs 24, which may be provided with spaced annular grooves 25 so as to be received through the apertures 26 and 27 in the idler wheel plate and motor supporting plate respectively.

The idler wheel spindle 28 is concentrically mounted upon the idler plate 23 and the idler wheel 29 is journalled thereon and provided with the usual rubber tire 30 which is held in frictional engagement with the motor pulley 20 and the inner surface of the turntable rim 22 by means of the coil spring 31 connected at one end to the idler plate as indicated at 32 and at its other end to the motor supporting plate as indicated at 33, tending to flex the rubber mounting studs 24 and move the idler plate 23 horizontally so as to urge the rubber tire 30 of the idler wheel into frictional contact with the motor pulley and the inner surface of the turntable rim 22 as shown in the drawings.

A very slight movement of the idler wheel plate is required, in actual practice this travel being approximately only about one sixteenth inch as this is sufficient to take care of wear on the rubber tire of the idler wheel and eccentricity and out of round characteristics in the turntable rim and motor pulley, and the flexural rubber mounting studs 24 will permit the necessary horizontal travel of the idler wheel plate.

These rubber supports are widely spaced so as to insure that the idler wheel will always be positioned substantially at right angles to the inner face of the rim of the turntable. Further it is pointed out that these rubber supports fix the vertical position of the idler wheel while the horizontal position thereof is variable to suit the requirements of the assemblies. No mechanical clearances are necessary as in the conventional arrangement since the horizontal movement of the idler plate is obtained through a flexural member rather than through a slidable member. This is the essential feature of the device as it eliminates rattles and chatter.

The equilibrium position of the idler wheel is maintained by the three forces of the turntable acting on the idler wheel and idler plate assembly, the motor pulley acting on the idler wheel and idler plate assembly and the spring acting on the idler plate and idler wheel. In principle the positioning is the same as in the conventional design but the rattle and chatter is eliminated.

In Figs. 3, 4 and 5 is shown a modification of the invention in which the rubber compression mounting members may be bonded to the edge of the metal idler plate. In this form of the invention the cabinet plate 10a, motor mounting plate 11a, supporting the motor 15a, motor pulley 20a, and turntable 21a with peripheral rim flange 22a may all be of the same construction and arrangement as above described.

For the purpose of distortably mounting the idler wheel plate 23a upon the motor supporting plate, a plurality of rubber compression supports 34 may be cemented, vulcanized or otherwise bonded to the peripheral edge of the idler plate 23a. These rubber supports may have metal attaching brackets 35 cemented, vulcanized or otherwise bonded to their outer ends for attachment to the motor supporting plate in any suitable manner.

The idler wheel spindle 28a is mounted upon the idler plate 23a and the idler wheel 29a is journalled thereon and provided with the rubber tire 30a which is normally held in frictional contact with the motor pulley 20a and the inner surface of the turntable rim flange 22a by means of the spring 31a which distorts the rubber compression supports 34 and moves the idler plate 23a horizontally in the proper direction.

In Figs. 6 and 7 is shown another modification of the invention in which the distortable mounting for the idler wheel plate is shown in the form of flexural coil springs mounting the idler plate in spaced relation above the motor mounting plate.

In this form of the invention the cabinet plate 10b, motor mounting plate 11b and motor 15b supported thereon, motor pulley 20b and turntable 21b with rim flange 22b may all be of the same construction and arrangement as above described.

The idler wheel plate 23b is flexurally supported above and in spaced relation to the motor supporting plate by means of the flexural coil springs 37 mounted at widely spaced points and connected to the two plates by means of the hooked ends 38 and 39 of the springs located through suitable apertures 40 and 41 respectively in the idler wheel plate 23b and the motor mounting plate 11b.

The idler wheel spindle 28b is concentrically mounted upon the idler plate 23b and the idler wheel 29b is journalled thereon and provided with the rubber tire 30b which frictionally contacts with the motor pulley 20b and the inner surface of the turntable rim 22b. The tension spring 31b connected at opposite ends to the idler wheel plate and the motor mounting plate flexes the springs 37 and moves the idler plate 23b horizontally so as to always urge the tire of the idler wheel into contact with the motor pulley and turntable rim.

I claim:

1. In a phonograph, the combination of a supporting plate, a motor carried by the plate, a driving means upon the motor, a turntable provided with a peripheral rim flange, an idler plate, a plurality of spaced distortable means connected to the supporting plate and the idler plate mounting the idler plate upon the supporting plate independently of the driving means and the turntable in spaced relation to the supporting plate, said distortable means being the only supporting means for the idler plate, an idler wheel journalled upon the idler plate and means for moving the idler plate to hold the idler wheel in contact with the driving means and with the turntable rim flange.

2. In a phonograph, the combination of a supporting plate, a motor carried by the plate, a driving means upon the motor, a turntable provided with a peripheral rim flange, an idler plate, a plurality of spaced rubber means connected to the supporting plate and the idler plate mounting the idler plate upon the supporting plate independently of the driving means and the turntable in spaced relation to the supporting plate, said rubber means being the only supporting means for the idler plate, an idler wheel journalled upon the idler plate and means for moving the idler plate to hold the idler wheel in contact with the driving means and with the turntable rim flange.

3. In a phonograph, the combination of a supporting plate, a motor carried by the plate, a driving means upon the motor, a turntable provided with a peripheral rim flange, an idler plate, rubber studs having opposite ends connected to the supporting plate and idler plate for mounting the idler plate upon the supporting plate independently of the driving means and the turntable in spaced relation to the supporting plate, an idler wheel journalled upon the idler plate and means for moving the idler plate to hold the idler wheel in contact with the driving means and with the turntable rim flange.

4. In a phonograph, the combination of a supporting plate, a motor carried by the plate, a driving means upon the motor, a turntable provided with a peripheral rim flange, an idler plate, rubber supports bonded to the idler plate and connected to the supporting plate for mounting the idler plate upon the supporting plate independently of the driving means and the turntable in spaced relation to the supporting plate, said rubber supports being the only supporting means for the idler plate, an idler wheel journalled upon the idler plate, and means for moving the idler plate to hold the idler wheel in contact with the driving means and with the turntable rim flange.

5. In a transmission including a support, a driving means, a driven means, a friction wheel engaging the driving means and driven means and a mounting member upon which the friction wheel is journalled, a plurality of spaced, distortable means mounting the mounting member upon the support independently of the driving means and driven means in spaced relation to the support, said distortable means being the only supporting means for the mounting member, and means for laterally urging the mounting member in a direction to hold the friction wheel in contact with the driving means and the driven means.

6. In a transmission including a support, a driving means, a driven means, a friction wheel engaging the driving means and driven means and a mounting member upon which the friction wheel is journalled, a plurality of spaced, flexural means mounting the mounting member upon the support independently of the driving means and driven means in spaced relation to the support, said flexural means being the only supporting means for the mounting member, and means for laterally urging the mounting member in a direction to hold the friction wheel in contact with the driving means and the driven means.

7. In a transmission including a support, a driving means, a driven means, a friction wheel engaging the driving means and driven means and a mounting member upon which the friction wheel is journalled, a plurality of spaced, rubber means mounting the mounting member upon the support independently of the driving means and driven means in spaced relation to the support, said rubber means being the only supporting means for the mounting member, and means for laterally urging the mounting member in a direction to hold the friction wheel in contact with the driving means and the driven means.

8. In a phonograph, the combination of a supporting plate, a motor carried by the plate, a driving means upon the motor, a turntable provided with a peripheral rim flange, an idler plate, rubber studs having opposite ends inserted through apertures in the idler plate and the supporting plate for mounting the idler plate upon the supporting plate independently of the driving means and the turntable in spaced relation to the supporting plate, an idler wheel journalled upon the idler plate, and means for moving the idler plate to hold the idler wheel in contact with the driving means and with the turntable rim flange.

9. In a phonograph, the combination of a supporting plate, a motor carried by the plate, a driving means upon the motor, a turntable provided with a peripheral rim flange, an idler plate, widely spaced flexural means mounting the idler plate upon the supporting plate, independently of the driving means and the turntable in spaced relation to the supporting plate, said flexural means being the only supporting means for the idler wheel, an idler wheel journalled upon the idler plate, and means for moving the idler plate to hold the idler wheel in contact with the driving means and with the turntable rim flange.

E. V. SCHNEIDER.

REFERENCES CITED

The following references are of record in the file of this patent:

UNITED STATES PATENTS

| Number | Name | Date |
| --- | --- | --- |
| 257,404 | Starr | May 2, 1882 |
| 719,037 | Pelstring et al. | Jan. 27, 1903 |
| 1,883,893 | Flaherty | Oct. 25, 1932 |
| 2,161,148 | Erwood | June 6, 1939 |
| 2,241,013 | Gay | May 6, 1941 |
| 2,257,804 | Lord | Oct. 7, 1941 |
| 2,260,289 | Brady et al. | Oct. 28, 1941 |
| 2,261,889 | Schneider | Nov. 4, 1941 |
| 2,324,992 | Riesing | July 20, 1943 |
| 2,442,752 | Beam | June 8, 1948 |